Nov. 30, 1943. E. E. HEWITT 2,335,513
DEPTH MICROMETER SCRIBER
Filed Oct. 20, 1942

Eugene E. Hewitt INVENTOR.

BY
Victor J. Evans & Co.
ATTORNEYS

Patented Nov. 30, 1943

2,335,513

UNITED STATES PATENT OFFICE 2,335,513

DEPTH MICROMETER SCRIBER

Eugene E. Hewitt, Indianapolis, Ind.

Application October 20, 1942, Serial No. 462,731

1 Claim. (Cl. 33—42)

My invention relates to the measurement of machine parts, location of points and lines on work, and has among its objects and advantages the provision of an improved depth micrometer scriber.

Figure 1:
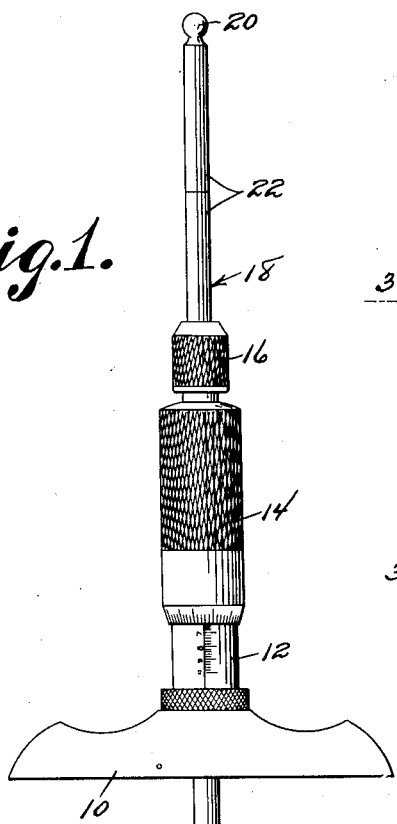
Figure 1 is an elevational view of my invention.
Figure 2:
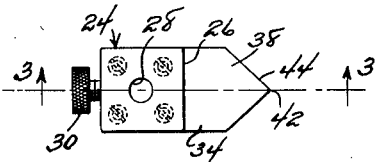
Figure 2 is a top view of the scriber element.
Figure 3:
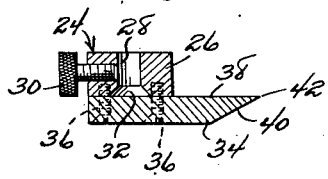
Figure 3 is a sectional view along the line 3—3 of Figure 2.
Figure 4:
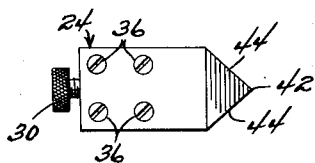
Figure 4 is a bottom view.
Figure 5:
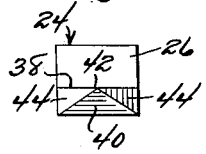
Figure 5 is an end view.

In the embodiment of the invention selected for illustration, I make use of the usual straight edge 10 in association with a graduated sleeve 12 provided with a rotary micrometer adjusting member 14. A clamp nut 16 is located at the end of the member 14 to secure the measuring post or spindle 18 to the member 14. This spindle includes a head 20 and is provided with spacing sleeves 22. The foregoing structure is old and well known in the art.

To the lower end of the spindle 18 is attached a scriber 24. This scriber includes a body 26 having a bore 28 for the reception of the lower end of the spindle. The spindle may be made secure to the body 26 by a set screw 30, and the bore 28 is flared at 32 as a receptacle for dirt or grinding dust which might otherwise give a false setting.

To the body 26 is attached a second body 34, as by screws 36. The body 34 includes a face 38 arranged at an angle of 90 degrees to the axis of the bore 28. One end of the body 34 is angled at 40 to provide a point 42 lying in the plane of the face 38. The angled face 40 is preferably at an angle of 20 degrees to the face 38. Both sides of the body 34 are angled at 44 in conjunction with the angular face 40 to provide a sharp point.

My invention provides a handy instrument of simple construction which may be employed for depth measuring purposes, laying out accurate patterns on work to be cut to different sizes and shapes, locating key seats and checking work in lieu of measuring with scales and the like.

Without further elaboration, the foregoing will so fully explain my invention, that others may, by applying current knowledge, readily adapt the same for use under various conditions of service.

I claim:

In a device of the type described, the combination of a micrometer rod, a scriber means having a body provided with a bore for the reception of one end of said rod, said bore being enlarged at one end to provide a foreign matter collection chamber about the end of the rod disposed in the bore, and means for fixedly but detachably relating said body and said rod.

EUGENE E. HEWITT.